Patented May 15, 1945

2,376,030

UNITED STATES PATENT OFFICE 2,376,030

POLYVINYL BUTYRAL COMPOSITIONS

La Verne E. Cheyney, Akron, Ohio, assignor to Wingfoot Corporation, Akron, Ohio, a corporation of Delaware No Drawing. Application April 21, 1943, Serial No. 483,923

1 Claim. (Cl. 260—36)

This invention relates to plasticized polyvinyl butyral compositions. More particularly, it relates to such compositions which are highly resistant to the passage of gases, such as hydrogen, oxygen, nitrogen, etc.

In general, the addition of a plasticizer to a plastic material softens the material and decreases its resistance to the passage of gases. It is exceptional when the addition of a plasticizer increases the resistance of a plastic to the passage of gases. In fact, those plasticizers which do not greatly reduce the gas resistance of plastics are finding wide application; for example, in the production of collapsible life-saving rafts, pontoons, aviators' suits, etc.

According to this invention, polyvinyl butyral, which may be one of the commercial grades of material which includes some of the nonhydrolyzed ester, is plasticized with a material of the class consisting of a mixture of methyl phthalyl ethyl glycollate and amorphous wax (the mixture produces greater resistance to the passage of gas than the addition of either alone would indicate); 2-amino-2-ethyl-1,3-propane-diol; methylene dimorpholine (prepared by the interaction of morpholine and formaldehyde); 2,2'-di-4-morpholinyl diethyl amine (prepared by the interaction of diethylene triamine and $\beta,\beta'$-dichloroethyl ether as described in Hardman U. S. 2,328,976); $\beta$-benzyloxy propionitrile (which may be prepared according to the process of Australian Patent 116,260); $\alpha$-methyl-$\alpha'$-phenyl g l y c e r y l ether; di-isopropyl glyceryl ether; and an ethanol amine, such as phenyl ethanolamine and ethyl phenyl ethanolamine. The invention is applicable to each of the present commercial types of polyvinyl butyral which differ somewhat in composition; viz., Butvar (Monsanto Chemical Company), Vinylite X (Carbide and Carbon Chemical Company), and Butacite (E. I. du Pont de Nemours and Company).

It is known that methyl phthalyl ethyl glycollate is highly compatible with polyvinyl butyral (Kocher U. S. 2,184,426). It is known that the plasticized composition containing an amorphous wax has a relatively high resistance to the passage of gases. Compositions containing up to 50 parts or more (per 100 of resin) of methyl phthalyl ethyl glycollate were practically as resistant to the passage of hydrogen gas as the unplasticized material. This resistance was markedly increased by the addition of up to 25 parts of various waxes, such as paraffin, Santowax, or amorphous petroleum waxes. The crystalline waxes, however, tend to stiffen the compositions when used in more than trace amounts. The preferred composition is, therefore, a combination of the resin and methyl phthalyl ethyl glycollate and an amorphous wax, especially the amorphous petroleum wax known as SS wax, sold by the National Wax Company. The composition may, for example, be composed of 100 parts polyvinyl butyral, 30 parts methyl phthalyl ethyl glycollate, and 5 parts SS wax or 100 parts polyvinyl butyral, 50 parts methyl phthalyl ethyl glycollate, and 5 parts SS wax. The composition may also contain other materials, such as stabilizers, pigments, colors, etc. The wax-containing composition possesses an additional advantage over the nonwax one; namely, markedly improved resistance to the effects of water. The composition can be immersed in or exposed to water for relatively long periods of time with little harmful effect. This is not true of the wax-free composition.

Compositions containing the wax without the methyl phthalyl ethyl glycollate have high resistance to the passage of gases, but it does not follow that all combinations of plasticizer and amorphous wax are excellent. The amorphous wax was tested in combination with many other plasticizers, including those of this invention, without beneficial effect; the combination with methyl phthalyl ethyl glycollate is unique in the benefits obtained. The wax alone (without the methyl phthalyl ethyl glycollate) does not produce a composition of sufficient flexibility. The amorphous waxes are believed to be mixtures, consisting of very high boiling, high molecular weight hydrocarbons, chiefly isoparaffinic in nature, but probably containing some cyclic material. They may contain a small amount of crystalline waxy material in admixture.

2-amino-2-ethyl-1,3-propane-diol is a good plasticizer for polyvinyl butyral, and the plasticized composition has a high resistance to the passage of gases. For instance, a composition containing 30 parts 2-amino-2-ethyl-1,3-propane-diol:100 parts resin gave a rate of diffusion of hydrogen gas considerably less than that of an unplasticized composition.

Methylene dimorpholine (prepared by the interaction of morpholine and formaldehyde) and 2,2'-di-4-morpholinyl diethyl amine (prepared by the interaction of diethylenetriamine and $\beta,\beta'$-dichloroethyl ether) have both been found to be good plasticizers for polyvinyl butyral and to form compositions which have a low rate of gas diffusion. Together with $\beta$-benzyloxy propionitrile, these morpholine compounds form a group, which compounded with polyvinyl butyral give plastics which have superior flexibility at low temperatures. Although their rate of gas diffusion may be somewhat higher than that of other materials here mentioned, they have a relatively high resistance to the passage of gases. Examples of compositions possessing these desirable properties are:

100 resin+25 methylene dimorpholine
100 resin+25 2,2'-di-4-morpholinyl diethyl amine
100 resin+55 2,2'-di-4-morpholinyl diethyl amine
100 resin+25 β'-benzyloxy propionitrile
100 resin+45 β'-benzyloxy propionitrile Of the glyceryl ethers, di-propyl glyceryl ether is especially valuable as a plasticizer for polyvinyl butyral because the plasticized composition has high flexibility at low temperatures and, likewise, has high resistance to the passage of gases. α-methyl-α'-phenyl glyceryl ether, likewise, offers great resistance to gas diffusion and, in addition, is highly compatible with the polyvinyl butyral. Examples of these compositions are:

100 resin+25 di-isopropyl glycerol ether
100 resin+35 di-isopropyl glyceryl ether
100 resin+25 methyl phenyl glyceryl ether
100 resin+40 methyl phenyl glyceryl ether Compounds which are good plasticizers for polyvinyl butyral and yield a plasticized product having high gas resistance include the phenyl ethanolamines, which may be represented by the formula:

$$R.Ph.NH_x(C_2H_4.OH)_y$$

in which Ph is phenyl, R is hydrogen or alkyl, $x$ is 0 or 1, $y$ is 1 or 2, and the sum of $x$ and $y$ is 2. Stress-strain data obtained on films 0.002–0.005 inch thick are given in the following table, from which it will be noted that the general effect of plasticizers of this class is to decrease the ultimate tensile strength and the load of the plastic at any given elongation while the ultimate elongation is increased:

*Stress-strain properties of plasticized films* 

| Plasticizer (parts : 100 resin) | 20% elong., kg./cm.² | 100% elong., kg./cm.² | Ultimate | |
|---|---|---|---|---|
| | | | Tensile strength, kg./cm.² | Elongation, per cent |
| None (control film) | 370 | | 370 | 32 |
| 30 phenyl ethanolamine | 1.5 | 3 | 6 | 560 |
| 30 phenyl diethanolamine | 1.6 | 8 | 99 | 450 |
| 25 ethyl phenyl ethanolamine | 33 | 88 | 160 | 200 |

Other beneficial effects, such as increased flexibility, resistance to shock, cutting action or tearing action, are, likewise, produced by these plasticizers. The effect of the plasticizer is, of course, within limits, proportional to the amount of the particular plasticizer employed and varies with the different members of the general class. Other examples of this general class might include methyl phenyl diethanolamine, butyl phenyl diethanolamine, etc. The phenyl ethanolamine and ethyl phenyl ethanolamine, as well as the other members of the general class mentioned above including those included in the general formula for this class, form compositions which are highly resistant to the passage of gases. The former is flexible at low temperatures. The latter has high resistance to water. Examples of such compositions are those listed above and others containing even larger amounts of the plasticizers. A composition which gave an extremely low rate of diffusion of hydrogen gas contained 35 parts of ethyl phenyl ethanolamine and 100 of resin. This composition was as resistant to the gas as a mixture of methyl phthalyl ethyl glycollate and wax, mentioned above.

The examples listed are intended to be only illustrative and do not limit the compositions. The compositions may be in any of the forms known in the art, such as molded products, calendered sheet material, cast film, textile or paper coatings, etc.

What I claim is:

A composition composed essentially of polyvinyl butyral and 2,2'-di-4-morpholinyl diethyl amine as a plasticizer.

LA VERNE E. CHEYNEY.

---

CERTIFICATE OF CORRECTION.

Patent No. 2,376,030.    May 15, 1945.

LA VERNE E. CHEYNEY.

It is hereby certified that error appears in the printed specification of the above numbered patent requiring correction as follows: Page 1, first column, line 45, before "known" insert --not--; page 2, first column, line 17, for "di-propyl" read --di-isopropyl--; and that the said Letters Patent should be read with this correction therein that the same may conform to the record of the case in the Patent Office.

Signed and sealed this 21st day of August, A. D. 1945.

(Seal)

Leslie Frazer
First Assistant Commissioner of Patents.

pounds form a group, which compounded with polyvinyl butyral give plastics which have superior flexibility at low temperatures. Although their rate of gas diffusion may be somewhat higher than that of other materials here mentioned, they have a relatively high resistance to the passage of gases. Examples of compositions possessing these desirable properties are:

100 resin+25 methylene dimorpholine
100 resin+25 2,2'-di-4-morpholinyl diethyl amine
100 resin+55 2,2'-di-4-morpholinyl diethyl amine
100 resin+25 β'-benzyloxy propionitrile
100 resin+45 β'-benzyloxy propionitrile Of the glyceryl ethers, di-propyl glyceryl ether is especially valuable as a plasticizer for polyvinyl butyral because the plasticized composition has high flexibility at low temperatures and, likewise, has high resistance to the passage of gases. α-methyl-α'-phenyl glyceryl ether, likewise, offers great resistance to gas diffusion and, in addition, is highly compatible with the polyvinyl butyral. Examples of these compositions are:

100 resin+25 di-isopropyl glycerol ether
100 resin+35 di-isopropyl glyceryl ether
100 resin+25 methyl phenyl glyceryl ether
100 resin+40 methyl phenyl glyceryl ether Compounds which are good plasticizers for polyvinyl butyral and yield a plasticized product having high gas resistance include the phenyl ethanolamines, which may be represented by the formula:

$$R.Ph.NH_x(C_2H_4.OH)_y$$

in which Ph is phenyl, R is hydrogen or alkyl, $x$ is 0 or 1, $y$ is 1 or 2, and the sum of $x$ and $y$ is 2. Stress-strain data obtained on films 0.002–0.005 inch thick are given in the following table, from which it will be noted that the general effect of plasticizers of this class is to decrease the ultimate tensile strength and the load of the plastic at any given elongation while the ultimate elongation is increased:

*Stress-strain properties of plasticized films*

| Plasticizer (parts : 100 resin) | 20% elong., kg./cm.² | 100% elong., kg./cm.² | Ultimate | |
|---|---|---|---|---|
| | | | Tensile strength, kg./cm.² | Elongation, per cent |
| None (control film) | 370 | -------- | 370 | 32 |
| 30 phenyl ethanolamine | 1.5 | 3 | 6 | 560 |
| 30 phenyl diethanolamine | 1.6 | 8 | 99 | 450 |
| 25 ethyl phenyl ethanolamine | 33 | 88 | 160 | 200 |

Other beneficial effects, such as increased flexibility, resistance to shock, cutting action or tearing action, are, likewise, produced by these plasticizers. The effect of the plasticizer is, of course, within limits, proportional to the amount of the particular plasticizer employed and varies with the different members of the general class. Other examples of this general class might include methyl phenyl diethanolamine, butyl phenyl diethanolamine, etc. The phenyl ethanolamine and ethyl phenyl ethanolamine, as well as the other members of the general class mentioned above including those included in the general formula for this class, form compositions which are highly resistant to the passage of gases. The former is flexible at low temperatures. The latter has high resistance to water. Examples of such compositions are those listed above and others containing even larger amounts of the plasticizers. A composition which gave an extremely low rate of diffusion of hydrogen gas contained 35 parts of ethyl phenyl ethanolamine and 100 of resin. This composition was as resistant to the gas as a mixture of methyl phthalyl ethyl glycollate and wax, mentioned above.

The examples listed are intended to be only illustrative and do not limit the compositions. The compositions may be in any of the forms known in the art, such as molded products, calendered sheet material, cast film, textile or paper coatings, etc.

What I claim is:

A composition composed essentially of polyvinyl butyral and 2,2'-di-4-morpholinyl diethyl amine as a plasticizer.

LA VERNE E. CHEYNEY.

---

CERTIFICATE OF CORRECTION.

Patent No. 2,376,030. May 15, 1945.

LA VERNE E. CHEYNEY.

It is hereby certified that error appears in the printed specification of the above numbered patent requiring correction as follows: Page 1, first column, line 45, before "known" insert --not--; page 2, first column, line 17, for "di-propyl" read --di-isopropyl--; and that the said Letters Patent should be read with this correction therein that the same may conform to the record of the case in the Patent Office.

Signed and sealed this 21st day of August, A. D. 1945.

(Seal)

Leslie Frazer
First Assistant Commissioner of Patents.